United States Patent [19]

Braid

[11] E Re. 28,805

[45] Reissued May 11, 1976

[54] LUBRICANTS CONTAINING AMINE ANTIOXIDANTS

[75] Inventor: Milton Braid, Westmont, N.J.

[73] Assignee: Mobil Oil Corporation, New York, N.Y.

[22] Filed: Sept. 25, 1974

[21] Appl. No.: 508,934

Related U.S. Patent Documents

Reissue of:

[64] Patent No.: 3,773,665
Issued: Nov. 20, 1973
Appl. No.: 199,732
Filed: Nov. 17, 1971

[52] U.S. Cl. ..... 252/50; 252/51.5 R; 252/401; 252/403

[51] Int. Cl.[2] ..... C10M 1/34

[58] Field of Search ..... 252/50, 51.5 R, 401, 252/403

[56] References Cited

UNITED STATES PATENTS

| | | | |
|---|---|---|---|
| 3,247,111 | 4/1966 | Oberright et al. | 252/50 |
| 3,282,840 | 11/1966 | Foster et al. | 252/50 |
| 3,347,791 | 11/1967 | Thompson et al. | 252/50 |
| 3,378,491 | 4/1968 | Braid et al. | 252/50 |
| 3,649,690 | 3/1972 | Wheeler | 252/401 X |
| 3,660,290 | 5/1972 | Schlobohm | 252/50 |
| 3,696,851 | 10/1972 | Randell | 252/50 X |
| 3,761,405 | 9/1973 | Jervis et al. | 252/50 X |
| 3,781,361 | 12/1973 | Wheeler | 252/401 X |
| 3,790,478 | 2/1974 | Rudston et al. | 252/51.5 R X |
| 3,804,762 | 4/1974 | Jervis et al. | 252/50 |

FOREIGN PATENTS OR APPLICATIONS

| | | | |
|---|---|---|---|
| 1,180,389 | 9/1970 | United Kingdom | 252/50 |
| 1,215,433 | 2/1970 | United Kingdom | 252/50 |

*Primary Examiner*—Delbert E. Gantz
*Assistant Examiner*—Andrew H. Metz
*Attorney, Agent, or Firm*—Charles A. Huggett; Raymond W. Barclay; Claude E. Setliff

[57] ABSTRACT

Lubricants containing a mixture of p,p'-dioctyldiphenylamine and substituted naphthylamines have improved antioxidant properties.

9 Claims, No Drawings

LUBRICANTS CONTAINING AMINE ANTIOXIDANTS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to lubricant compositions having improved antioxidant characteristics. More particularly, the invention relates to lubricants to which have been added a combination of additives which imparts antioxidants properties thereto.

2. Discussion of the Prior Art

Lubricating oils and greases are subject to oxidative deterioration at elevated temperatures or upon prolonged exposure in an ordinary atmosphere. Such deterioration is in many instances evidenced by an increase in acidity and in viscosity, and when the deterioration is severe enough it can cause metal parts to corrode. Additionally, there is a loss of lubricating properties which may lead to complete failure of the part or parts in contact with the oil. Numerous additives have been tried as antioxidants in lubricants, but many of them are only marginally effective except at the higher concentrations.

The use of amines as lubricant antioxidants is, of course, well known. As an example, U.S. Pat. No. 3,126,344 discloses the use of such amines as phenyl-α-naphthylamine, p-amino diphenylamine and p,p'-dioctyldiphenylamine as antioxidants in synthetic ester lubricating oils. Representative of other patents disclosing the use of single amines are U.S. Pat. No. 3,231,499 and U.S. Pat. No. 3,309,314.

In addition, it is known to use mixtures of amines as antioxidants for lubricants. U.S. Pat. No. 3,148,147 discloses for instance, the use of a mixture of phenyl-α-naphthylamine and diphenylamine. In U.S. Pat. No. 3,247,111 it is taught that a particularly outstanding combination involves a mixture of phenyl-α-naphthylamine and dioctyl diphenylamine. U.S. Pat. No. 3,309,318 teaches the same combination.

As will appear hereinafter, the combinations of the present invention are superior to the mixtures taught by U.S. Pat. No. 3,247,111 and 3,309,318.

SUMMARY OF THE INVENTION

The invention provides a lubricant composition comprising a major proportion of a lubricant and an antioxidant amount of a mixture comprising p,p'-dioctyl diphenylamine and a substituted naphthylamine.

DESCRIPTION OF SPECIFIC EMBODIMENTS

The substituted naphthylamine useful as one component of the amine mixture [ has the formula ] *is defined by one of the formulas:*

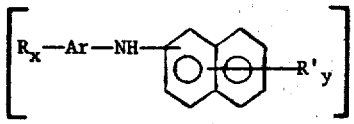

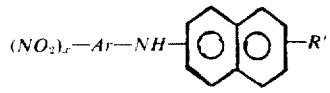

*or*

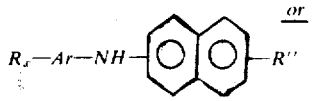

where R is an alkyl group having from about 4 to about 20 carbon atoms, [ or a nitro group ] Ar is phenyl or naphthyl, R' is hydrogen or a phenylazo group, *R' is a phenylazo group, and* x is [ 0 ] *1* [ to ] *or* 2. [ and y is 0 to 1, their sum being at least 1 ]

Effective antioxidant mixtures of this invention will contain from about 0.001% to about 5% by weight of the p,p'-dioctyl diphenylamine and of a second amine of the above formula. Thus, the mixed amines will comprise from about 0.002% to about 10%, preferably from about 0.1% to about 5% by weight, of the lubricant. In selecting appropriate concentrations within these ranges, it will generally be found that the best antioxidant activity will be realized from mixtures wherein the ratios of p,p'-dioctyl diphenylamine to second amine are from about 4 to about 1:4.

The lubricants which may be improved by the addition thereto of the above-mentioned amine mixtures are mineral oils, both paraffinic and naphthenic, synthetic oils, and greases made from these oils. The synthetic oils include polyolefin fluids, polyglycols, polyacetals, the siloxanes and the like. Especially useful are those synthetic esters which are becoming more and more popular, particularly in aviation. These include esters made from polycarboxylic acids and monohydric alcohols, such as those obtained by reacting methanol, ethanol, propanol, butanol, neopentyl alcohol and the like with pimelic acid, azelaic acid, adipic acid and the like, or from polyhydric alcohols and monocarboxylic acids. Of these preferred members are those made from trimethylol alkanes, where alkane includes ethane, propane and butane, pentaerythritol, di- and tripentaerythritol, or mixtures thereof and an aliphatic monocarboxylic acid containing from 1 to about 20 carbon atoms or a mixture of such acids. The most preferred are esters from the pentaerythritols and monocarboxylic acids having from 5 to 9 carbon atoms, or mixtures of these acids. The polyolefin fluids contemplated are those prepared from monoolefins having from about 4 to about 22 carbon atoms. Preferred are the trimers and tetramers of decene-1.

The following examples and evaluations will serve to specifically illustrate the method of making the substituted naphthylamines used in the practice of this invention and the use of mixtures of amines as lubricant antioxidants. It will be understood that they are illustrative only and are not intended to limit the scope of the invention in any way.

EXAMPLE 1

N-2,4-Dinitrophenyl-1-naphthylamine

A mixture of 20.3 g. of 1-chloro-2,4-dinitrobenzene, 14.3 g of 1-naphthylamine, 10 g. of sodium acetate and 100 ml of ethanol was heated to reflux for several hours. The hot reaction mixture was filtered and the N-2,4-dinitrophenyl-1-naphthylamine crystallized on cooling. Recrystallization from ethanol afforded orange crystalline solids melting at 191°–193° C.

EXAMPLE 2

1,1'-Dinaphthylamine

A mixture of 90 g. of 1-[naphtylamine] *naphthylamine* and 72.4 g. of 1-[naphtylamine] *naphthylamine* hydrochloride was heated at 225° C. for 22 hours. Unreacted naphthylamine was removed by distillation. The residue was extracted with benzene and 1,1'-dinaphthylamine was obtained by crystallization from the alumina column chromatographed benzene solution as white crystals melting at 115°–116° C.

A sample of the test composition was heated and air at the rate of about 5 liters per hour was passed through for a period of about 24 hours at 450° F. Present in the test sample were specimens of iron, copper, aluminum, and lead. It should be noted that the metals are typical metals of engine or machine construction, and they also provide some catalysis for the oxidation of organic materials. The results are tabulated in the following table. The change in kinematic viscosity, measured in centistokes at 100° F. (% KV change) and the change in the neutralization number (NN change) are measures of the effectiveness of an antioxidant in lubricants.

TABLE

| Additive | Weight percent | ΔNN | ΔKV, percent | Pb loss, mg. | Sludge |
|---|---|---|---|---|---|
| | — | 8.25 | 585 | 13.7 | Trace. |
| 2,4-dinitro PAN[1] | 1.0 | | | | |
| VAN 81[2] | 1.0 | 2.10 | 33 | 14.3 | Nil. |
| | 1.0 | | | | |
| Do | 0.5 | 3.55 | 85 | 10.5 | Nil. |
| t-Octyl PAN | 1.0 | | | | |
| VAN 81 | 1.0 | 2.09 | 64 | 2 | Nil. |
| 1,1'-DNA[3] | 1.0 | | | | |
| VAN 81 | 1.0 | 2.25 | 43 | 32.3 | Nil. |
| | 0.5 | | | | |
| Do | 1.0 | 2.57 | 43 | 15 | Nil. |
| Phenylazo-t-octyl: | | | | | |
| PAN | 1.0 | | | | |
| VAN 81 | 1.0 | 2.0 | 53.0 | 0 | Nil. |
| | 2.0 | | | | |
| Do | 1.0 | 1.9 | 55 | 0.5 | Nil. |
| Phenylazo-t-octyl: | | | | | |
| PAN (Example 3). | 1.0 | 3.9 | 117 | 1.7 | Nil. |
| VAN 81 | 1.0 | 6.64 | 390 | 2.7 | Trace. |
| | 1.0 | 3.15 | 51 | 44.0 | Heavy. |
| 1,1'-DNA | 0.5 | 3.17 | 67 | 41.3 | Do. |
| PAN | 1 | 3.54 | 92 | 4.1 | Light. |
| PAN | 1.0 | | | | |
| VAN 81 | 1.0 | 5.35 | 98 | 13.6 | Trace. |

[1]PAN = phenyl-1-naphthylamine.
[2]VAN 81 = p,p'-dioctyldiphenylamine.
[3]1,1'-DNA=1,1'-dinaphthylamine.

EXAMPLE 3

N-(4-tert-Octylphenyl)-4-phenylazo-1-naphthylamine

To a solution of 82.5 g. of N-4-tert-octylphenyl-1-naphthylamine in 500 ml of 1,2-dimethoxyethane cooled to 0.5° there was added while stirring during 0.5 hour an aqueous solution of benzenediazonium chloride prepared from 23.3 g. of aniline, 17.3 g. of sodium nitrite and dilute hydrochloric acid.

The reaction mixture was then allowed to warm to room temperature after the addition was completed and was further diluted with water. The gray solids which separated were collected, treated with ammonia in methanol suspension, and recrystallized from ethanol. The N-(4-tert-octylphenyl)-4-phenylazo-1-naphthylamine was obtained as a red crystalline solid melting at 135°–137° C.

EVALUATION OF PRODUCTS

OXIDATION TEST

The compounds produced in accordance with this invention were blended into a synthetic ester oil lubricant (made by reacting pentaerythritol with an equimolar mixture of $C_5$ and $C_9$ monocarboxylic acids) and tested in an oxidation test in accordance with the following procedure.

Other substituted naphthylamines useful in the mixtures of this invention are the following.

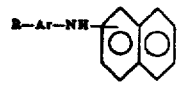

| R | Ar |
|---|---|
| $C_4H_9$ | phenyl |
| $C_4H_9$ | naphthyl |
| $C_6H_{13}$ | phenyl |
| $C_6H_{13}$ | naphthyl |
| $C_{14}H_{19}$ | phenyl |
| $C_{14}H_{29}$ | naphthyl |
| $C_{18}H_{35}$ | phenyl |
| $C_{18}H_{35}$ | naphthyl |
| $C_{20}H_{41}$ | phenyl |
| $C_{20}H_{41}$ | naphthyl |

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claims.

I claim:

1. A lubricant composition comprising a major proportion of a lubricant and an antioxidant amount of a mixture comprising p,p'-dioctyldiphenylamine and a substituted naphthylamine of [ the formula ] *one of the formulas*

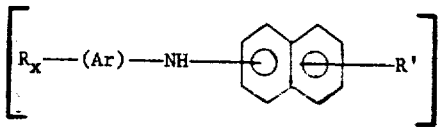

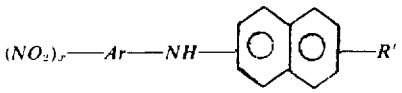

*or*

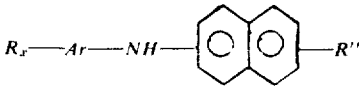

wherein R is [ $NO_2$ or ] an alkyl of from 4 to 20 carbon atoms, Ar is phenyl or naphthyl, R' is hydrogen or phenylazo, [ R' being hydrogen when R is nitro, ] *R'' is phenylazo* and x is 1 or 2.

2. The composition of claim 1 wherein the p,p'-dioctyldiphenylamine is present therein to the extent of from about 0.001% to about 5% by weight.

3. The composition of claim 1 wherein the substituted naphthylamine is present therein to the extent of from about 0.001% to about 5% by weight.

4. The composition of claim 1 wherein the mixture comprises from about 0.002% to about 10% by weight thereof.

5. The composition of claim 1 wherein the lubricant is a lubricating oil or grease.

6. The composition of claim 5 wherein the lubricating oil is a synthetic ester lubricating oil.

7. The composition of claim 1 wherein the substituted naphthylamine is N-2,4-dinitrophenyl-1-naphthylamine.

[ 8. The composition of claim 1 wherein the substituted naphthylamine is N-tert-octylphenyl-1-naphthylamine. ]

9. The composition of claim 1 wherein the substituted naphthylamine is N-(4-tert-octylphenyl)-4-phenylazo-1-naphthylamine.

10. [ The composition of claim 1 wherein the substituted naphthylamine is ] *A lubricant comprising a major proportion of a lubricant and an antioxidant amount of a mixture comprising p,p'-dioctyldiphenylamine and* 1,1'-dinaphthylamine.

* * * * *

UNITED STATES PATENT AND TRADEMARK OFFICE

CERTIFICATE OF CORRECTION

PATENT NO. : Re 28805

DATED : May 11, 1976

INVENTOR(S) : Milton Braid

It is certified that error appears in the above-identified patent and that said Letters Patent are hereby corrected as shown below:

Column 2, line 28, "4 to about 1:4" should be --4:1 to about 1:4--.
Column 2, line 67, "to" should be --at--.
Column 3, line 52, "was then allowed" should be --was allowed--.
Column 6, line 25, Claim 10, "A lubricant comprising" should be --A lubricant composition comprising--.

Signed and Sealed this

Fourth Day of January 1977

[SEAL]

*Attest:*

RUTH C. MASON
*Attesting Officer*

C. MARSHALL DANN
*Commissioner of Patents and Trademarks*